May 27, 1930.  J. B. PALMER  1,760,167
SPINNING TONGS
Filed Aug. 9, 1929
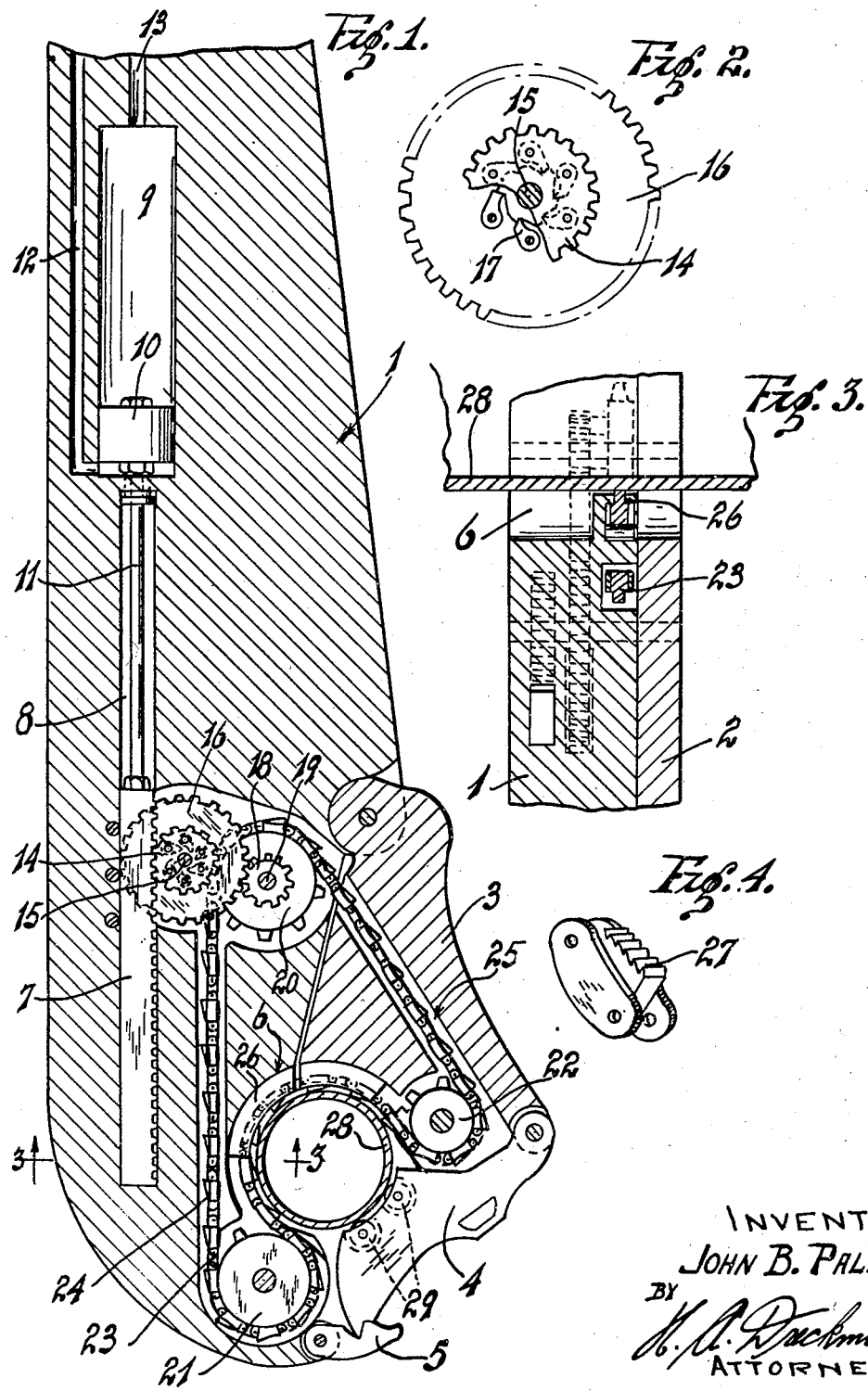
INVENTOR
JOHN B. PALMER.
BY
ATTORNEY.

Patented May 27, 1930

1,760,167

UNITED STATES PATENT OFFICE

JOHN B. PALMER, OF LONG BEACH, CALIFORNIA

SPINNING TONGS

Application filed August 9, 1929. Serial No. 384,637.

This invention relates to a spinning tongs by means of which pipe, casing or the like may be screwed together prior to placing the same into a well. This invention is particularly applicable to oil wells in which it is very desirable to quickly screw the pipe together so that a minimum time is lost in running the pipe into the well.

An object of my invention is to provide an effective spinning tongs which will grip the pipe and rapidly rotate the same so as to screw the upper stand upon the stand already inserted into the hole.

Another object of invention is to provide a spinning tong of the character stated in which the pipe can be quickly and easily placed through a gate which opens the entire front portion of the tongs.

Other objects, advantages and features of invention may appear from the accompanying drawing, the subjoined detailed description and the appended claims.

In the drawing:

Figure 1 is a fragmentary longitudinal sectional view of my tongs.

Figure 2 is a plan view of the driving gear and ratchet with parts broken away.

Figure 3 is a fragmentary sectional view taken on line 3—3 of Figure 1.

Figure 4 is a perspective view of one of the chain links.

Referring more particularly to the drawing, the numeral 1 indicates the main body of the tongs which consists of a heavy casting with a cover plate 2 secured to the top thereof. A jaw 3 is hingedly mounted to the body 1 adjacent the outer end thereof, and a gate 4 is hingedly secured to the jaw 3, and is removably latched to the body by a suitable latch 5. The body 1 is provided with a pipe receiving recess 6, which recess is adapted to be closed so as to retain the pipe by means of the gate 4. After the pipe has been placed in the tongs, it is then necessary to rapidly rotate the pipe so as to screw it upon the next lower stand, and this is accomplished by the following mechanism.

A rack 7 is slidably mounted in a groove 8 in the body 1. The rack is moved in the groove by means of a hydraulic cylinder 9, the piston 10 of which is connected to the rack by a pitman 11. Fluid is introduced into the cylinder 9 through ducts 12—13, which ducts extend through the body 1 to the cylinder and the flow therethrough is controlled by a hand valve (not shown). It will be seen that with the arrangement of ducts, the piston 10 is positively moved back and forth in the cylinder.

The rack 7 meshes with a gear 14, which gear is journaled upon a shaft 15 secured in the body 1 of the tongs. A driving gear 16 is also journaled upon the shaft 15 and the gears 14—16 are rotated together by means of a clutch or spring dog coupling 17. That is, the gear 16 rotates with the gear 14 when the rack 7 moves towards the outer end of the body 1. As the rack returns, the dogs 17 are released and the gear 16 will be stationary while the gear 14 continues to rotate.

A reduction gear 18 is secured to a shaft 19, which shaft is journaled in the body 1. A sprocket 20 is secured to the shaft 19 below the gear 18. A second sprocket 21 is journaled in the body 1 adjacent the outer end thereof, and close to the latch 5. A third sprocket 22 is journaled in the jaw 3 adjacent the outer end thereof. A chain 23 encircles the sprockets 20—21—22 and this chain passes through run-ways 24 in the body 1 and 25 in the jaw 3. The chain 23 is caused to curve around the recess 6 in the body so as to conform to the shape of the pipe, and a track or groove 26, arcuate in shape, is provided so that the chain will make the proper curve to properly engage the pipe.

A plurality of toothed or serrated lugs 27 are provided on the chain 23 for the purpose of engaging and gripping the pipe so as to rotate the pipe. The pipe 28 is held in the tongs against the chain 23 by the gate 4 and jaw 3, as shown in Figure 1. Rollers 29 are provided on the gate 4 so that there will be less frictional resistance to the rotation of the pipe.

The operation of my invention will be evident from the foregoing description.

Having described my invention, I claim:

1. A spinning tongs comprising a body, a pair of sprockets mounted in the body, a jaw pivotally secured to the body, said body having a pipe receiving recess therein, a gate pivoted to the jaw and latched to the body, said gate closing said pipe receiving recess, a third sprocket mounted in the jaw, a chain encircling all of said sprockets, so that the third sprocket may loop said chain about the work in the recess pipe engaging means on the chain and a driving means engaging one of said sprockets whereby the chain is rotated to spin the pipe.

2. A spinning tongs comprising a body, a pair of sprockets mounted in the body, a jaw pivotally secured to the body, said body having a pipe receiving recess therein, a gate pivoted to the jaw and latched to the body, said gate closing said pipe receiving recess, a third sprocket mounted in the jaw, a chain encircling all of said sprockets, so that the third sprocket may loop said chain about the work in the recess pipe engaging means on the chain and a driving means engaging one of said sprockets whereby the chain is rotated to spin the pipe, said driving means comprising a rack, gear means between said rack and sprocket and means to reciprocate said rack.

3. A spinning tongs comprising a body, a pair of sprockets mounted in the body, a jaw pivotally secured to the body, said jaw having a pipe receiving recess therein, a gate pivoted to the jaw and latched to the body, said gate closing said pipe receiving recess, a third sprocket mounted in the jaw, a chain encircling all of said sprockets, so that the third sprocket may loop said chain about the work in the recess pipe engaging means on the chain, a rack slidably mounted in the body, gears mounted in the body and extending from said rack to one of said sprockets whereby said sprocket is rotated to actuate the same and a hydraulic cylinder in the body, a piston in the cylinder and a piston rod extending from the piston to the rack whereby the rack is reciprocated.

4. A spinning tongs comprising a body, a pair of sprockets mounted in the body, a jaw pivotally secured to the body, said body having a pipe receiving recess therein, a gate pivoted to the jaw and latched to the body, said gate closing said pipe receiving recess, a third sprocket mounted in the jaw, a chain encircling all of said sprockets so that the third sprocket may loop said chain about the work in the recess, pipe engaging means on the chain, a rack slidably mounted in the body, a gear meshing with the rack, a second gear below the first named gear, uni-directional clutch means between both of said gears, a third gear secured to one of said sprockets, said third gear meshing with said second gear, a hydraulic cylinder in the body, a piston in the cylinder and a piston rod extending from the piston to the rack whereby the rack is reciprocated.

In testimony whereof, I affix my signature.

JOHN B. PALMER.